United States Patent [19]
Liao

[11] Patent Number: 5,836,413
[45] Date of Patent: Nov. 17, 1998

[54] HOVERCRAFT CAPABLE OF STORING ENERGY AND AIR-CUSHION PRODUCING METHOD THEREFOR

[76] Inventor: Pen-Chang Liao, No. 6, Lane 255, Min-Sheng-I Rd., Hsin-Hsing Dist., Kaohsiung City, Taiwan

[21] Appl. No.: 779,508

[22] Filed: Jan. 7, 1997

[51] Int. Cl.⁶ ........................................................ B60V 1/02
[52] U.S. Cl. ............................ 180/116; 180/120; 180/126
[58] Field of Search ...................................... 180/116, 117, 180/118, 120, 121, 122, 124, 125, 126, 127, 128, 129, 130

[56] References Cited

U.S. PATENT DOCUMENTS 3,810,522   5/1974   Morgan et al. .......................... 180/116

FOREIGN PATENT DOCUMENTS

1182103   2/1970   United Kingdom ................... 180/120
1207960   10/1970  United Kingdom ................... 180/128

*Primary Examiner*—Kevin Hurley
*Attorney, Agent, or Firm*—Knobbe, Martens, Olson & Bear LLP

[57] ABSTRACT

A hovercraft includes a plurality of energy storing containers for storing a low-temperature, high-pressure gas therein, a heat exchange device for performing heat exchange between the gas from the containers and a high-temperature exhaust from a gas turbine engine unit, and an air-cushion generating device accepting the gas from the heat exchange device so as to form an air cushion. The air-cushion producing method for the hovercraft includes producing the high-temperature exhaust from the gas turbine engine unit, providing the low-temperature, high-pressure gas, performing heat exchange between the gas from the containers and the exhaust from the gas turbine engine unit, combining the gas and the exhaust after the heat exchange by siphon action, and directing the gas and the exhaust into the air-cushion generating device.

12 Claims, 8 Drawing Sheets

HOVERCRAFT CAPABLE OF STORING ENERGY AND AIR-CUSHION PRODUCING METHOD THEREFOR

BACKGROUND OF THE INVENTION

1. Field of the Invention

This invention relates to a hovercraft, more particularly to an inexpensive hovercraft capable of storing energy and the air-cushion producing method therefor.

2. Description of the Related Art

Recently, most hovercrafts are employed to carry passengers. Although a bulky hovercraft can serve as a cargo ship for carrying containers, it is necessary for the hovercraft to be equipped with several devices which include an air-cushion generating device, a navigation unit, a steering unit, a propulsion unit for moving the hovercraft on the sea, and a propulsion unit for moving the hovercraft in the harbor, etc. These devices result in greatly increased transport costs for carrying the containers. Furthermore, the container-carrying hovercraft has to consume a large amount of expensive particular fuel in producing an air cushion.

SUMMARY OF THE INVENTION

An object of this invention is to provide a hovercraft which can convey a plurality of containers thereon and which can store energy for forming an air cushion so as to reduce the consumption of fuel.

According to one aspect of this invention, a hovercraft includes a boat hull, a gas turbine engine unit installed on the boat hull, an air-cushion generating device disposed on the boat hull, and a propeller device drivable by the gas turbine engine unit. The hull has a skirt at a bottom thereof. The gas turbine engine unit is provided with an exhaust duct unit. The hull further includes an energy storing unit and a heat exchange device which are disposed thereon. The energy storing unit includes a plurality of energy storing containers suitably arranged in the hull. The heat exchange device has an output pipe which has an outlet end that is coupled and communicated with the air-cushion generating device. Each of the containers is adapted to receive therein a low-temperature, high-pressure gas which flows into the heat exchange device. The gas turbine engines can be operated to discharge a high-temperature exhaust therefrom which flows into the heat exchange device so as to exchange heat with the low-temperature, high-pressure gas coming from the containers, thus increasing the volume of the gas and decreasing the pressure of the gas. Accordingly, the air-cushion generating device can produce continuously a downward gas flow so as to form within the skirt an air cushion for supporting the hull.

According to another aspect of this invention, an air-cushion producing method for a hovercraft includes the steps of:

(1) guiding and discharging a high-temperature exhaust from a gas turbine engine unit on the hull of the hovercraft into a heat exchange device which is provided on the hull;

(2) storing a low-temperature, high-pressure gas within a plurality of energy storing containers which are disposed on the hull;

(3) pumping the low-temperature, high-pressure gas into the heat exchange device so as to exchange heat with the high-temperature exhaust discharged from the gas turbine engine unit, thereby increasing the volume of the gas and decreasing the pressure of the gas; and (4) discharging the gas from an output pipe of the heat exchange device into an air-cushion generating device on a bottom of the hull so as to form an air cushion under the hull.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
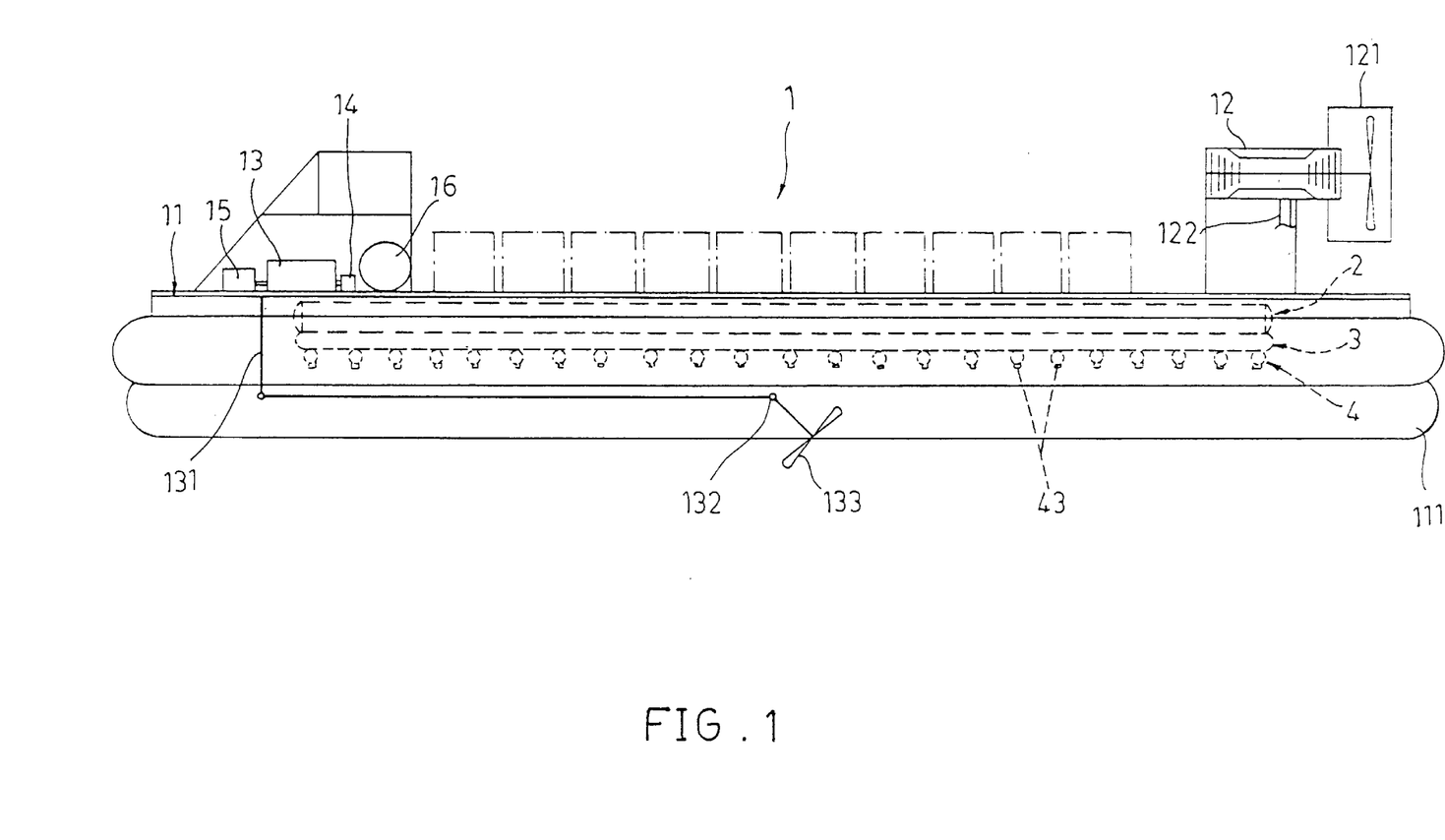
FIG. 1 is a schematic side view illustrating a hovercraft of this invention.
Figure 2:
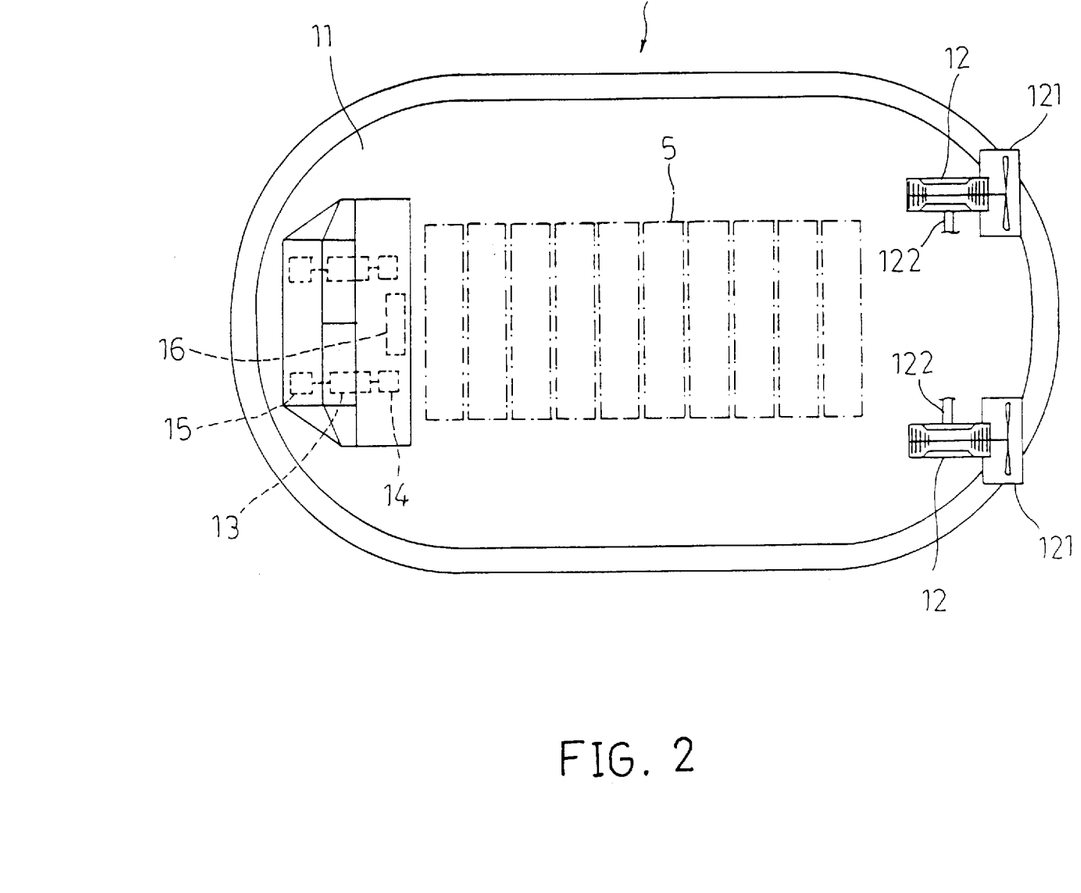
FIG. 2 is a schematic top view illustrating the hovercraft of this invention.

FIGS. 1 and 2 are respectively side and top views of a hovercraft according to this invention. As illustrated, the hovercraft 1 serves as a cargo ship and includes a boat hull 11 adapted to carry several rows of containers 5 indicated by phantom lines, a gas turbine engine unit consisting of two gas turbine engines 12 which are disposed on a rear end portion of the hull 11, an energy storing unit 2 disposed on the bottom of the hull 11, a heat exchange device 3 mounted on and under the lower end portion of the energy storing unit 2, and an air-cushion generating device 4 mounted on and under the lower end portion of the heat exchange device 3. The hull 11 has a skirt 111 at the bottom thereof. Each of the gas turbine engines 12 drives a propeller 121 and is provided with an exhaust duct 122. The propellers 121 constitute a propeller device. The exhaust ducts 122 constitute an exhaust duct unit. The air-cushion generating device 4 is equipped with a plurality of downwardly directed nozzles 43 for discharging gas therefrom. Two diesel engines 13 are disposed on a front end portion of the hull 11. Each of the diesel engines 13 serves as a power source for driving an air compressor 14 which feeds compressed gas to the energy storing unit 2. Two driving shafts 131 (only one is shown in FIG. 1) are respectively and operatively coupled with the diesel engines 13 and are connected to two propeller propulsion units 133 (only one is shown in FIG. 1) by means of two universal joints or speed-reduction gears 132 (only one is shown in FIG. 1), so as to drive the propeller propulsion units 133. Two generators 15 are coupled operatively with the diesel engines 13 so as to supply electrical power to electrical appliances on the hull 11. The fuel to be supplied to the diesel engines 13 or gas turbine engines 12 can be stored in two fuel tanks 16.

Figure 3:
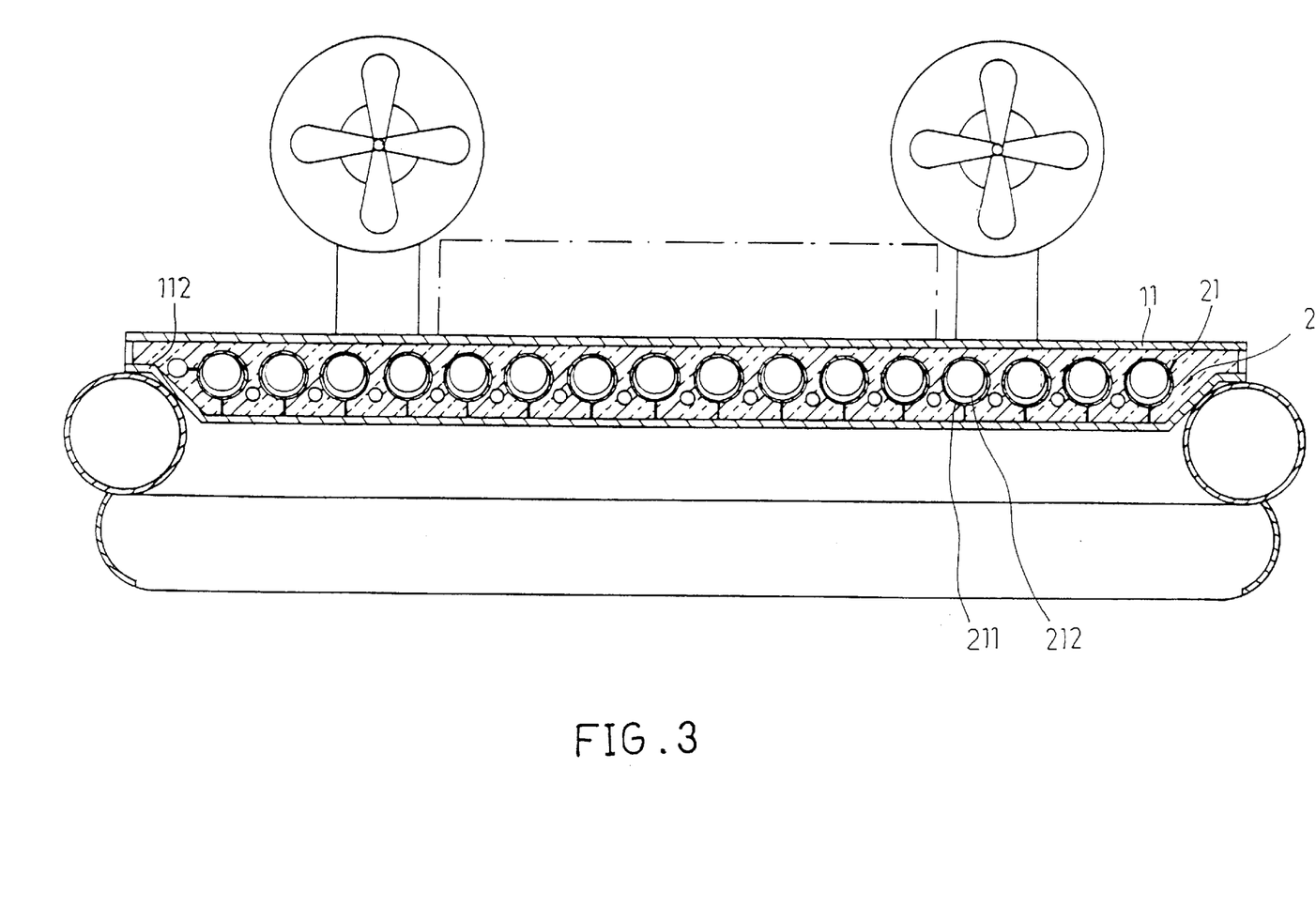
FIG. 3 is a schematic rear view illustrating the hovercraft of this invention.

Referring to FIG. 1 and FIG. 3, which is a rear view of the preferred embodiment, the energy storing unit 2 includes two rows of parallel cylindrical energy storing containers 21, each of which consists of an outer pipe 211 and a compressible inner pipe 212 that define a tubular first gas passage therebetween in the container 21. In each of the containers 21, the tubular first gas passage is insulated fluidly from the interior of the inner pipe 212.

Figure 4:
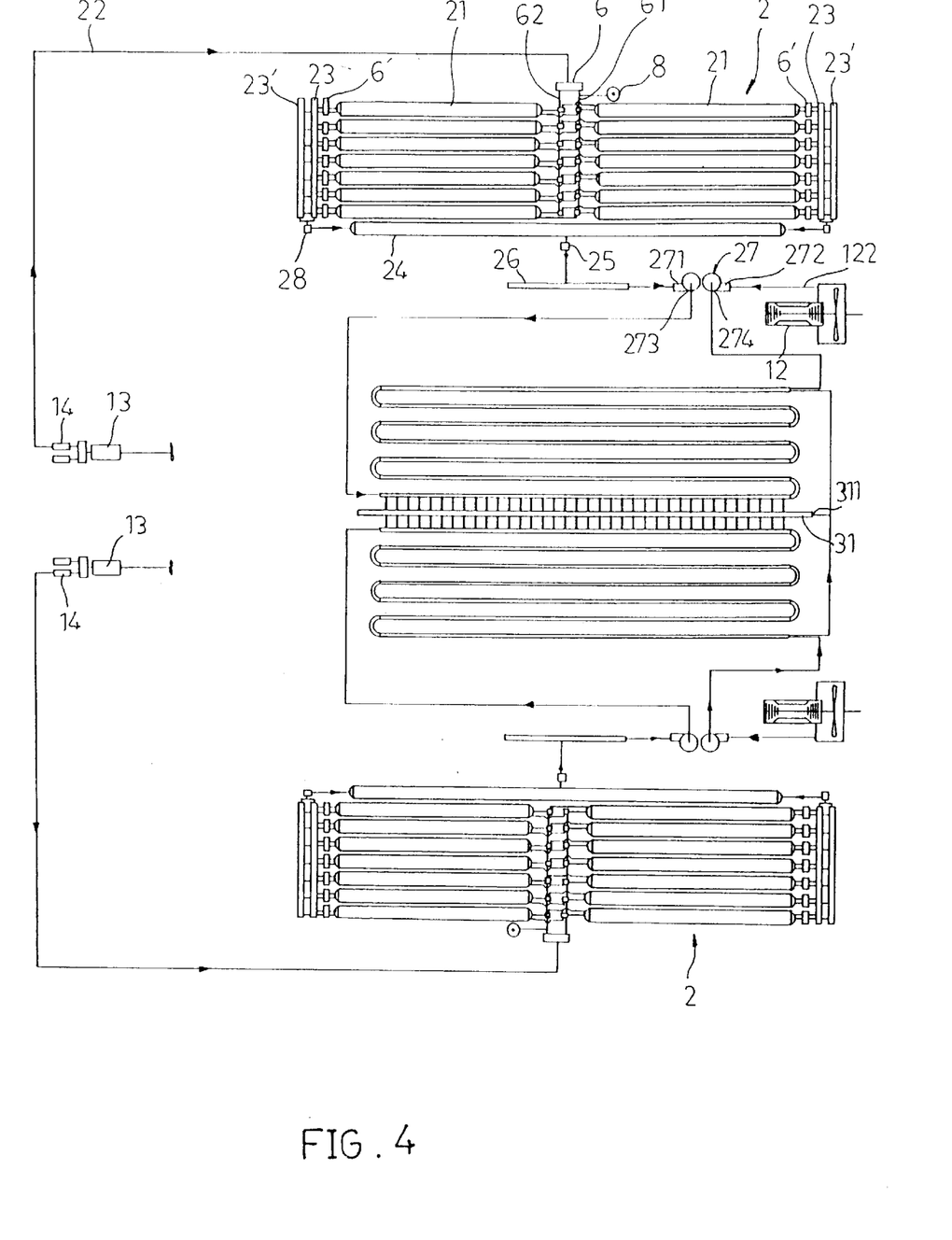
FIG. 4 is a schematic view illustrating the flow path of gas in the hovercraft of this invention.

Referring to FIG. 3 and FIG. 4, which illustrates the flow path of gas in the hovercraft of this invention, the energy storing unit 2 further includes an input pipe 22, a primary pipe 61, an auxiliary pipe 62, a first delivery pipe unit consisting of two first delivery pipes 23, a second delivery pipe unit consisting of two second delivery pipes 23', and a gas collecting pipe 24. The input pipe 22 is communicated with the containers 21 so as to permit the compressed gas coming from the air compressors 14 to flow into the containers 21. The primary pipe 61 is adapted to be communicated with both a gas supply source 8 and the inner pipes 212 of the containers 21. The auxiliary pipe 62 is communicated with both the input pipe 22 and the tubular first gas passages defined between the outer and inner pipes 211 and 212 in the containers 21 so that gas can flow from the input pipe 22 into the auxiliary pipe 62. The first delivery pipe 23 is communicated with the inner pipes 212 of the containers 21. The second delivery pipe 23' is communicated with the tubular first gas passages defined between the outer and inner pipes 211 and 212 in the containers 21. The gas collecting pipe 24 is a straight pipe having two ends which are respectively communicated with the first and second delivery pipes 23 and 23'. The gas supply source 8 is installed on the land near a harbor and provides a low-temperature, high-pressure gas that is produced by an inexpensive off-peak power. A flow-direction controlling valve 6 is installed among the input pipe 22, the primary pipe 61, and the auxiliary pipe 62. The energy storing unit 2 further includes two three-way valves 28, each of which is installed among one first delivery pipe 23, one second delivery pipe 23' and the gas collecting pipe 24, and each of which can be actuated so as to communicate the gas collecting pipe 24 with a selected one of the first delivery pipe 23 and the second delivery pipe 23'. As illustrated, a flow-rate controlling valve 25 is interposed between the gas collecting pipe 24 and an expansion pipe 26 so as to control flow rate of the gas between the gas collecting pipe 24 and the expansion pipe 26. A turbosupercharger 27 is connected to the expansion pipe 26 and has two input ports 271 and 272 and two output ports 273 and 274. The left input port 271 is communicated with the expansion pipe 26 and thus the output end of the gas collecting pipe 24. The right input port 272 is communicated with the exhaust ducts 122 of the gas turbine engines 12. The low-temperature, high-pressure gas flows from the gas supply source 8 into the inner pipes 212 of the containers 21 through the primary pipe 61. When the amount of the gas left within the inner pipes 212 of the containers 21 is too little to flow from the inner pipes 212 by virtue of the pressure thereof, the air compressors 14 are actuated so that the compressed gas flows from the air compressors 14 into the tubular first gas passages defined between the outer and inner pipes 211 and 212 in the containers 21 through the input pipe 22 and the auxiliary pipe 62. The flow-direction controlling valve 6 is located normally at a first position in which the tubular first gas passages defined between the outer and inner pipes 211 and 212 in the containers 21 are communicated with the input pipe 22 and the auxiliary pipe 62 so as to permit the gas to flow from the air compressors 14 into the tubular first gas passages defined between the outer and inner pipes 211 and 212 in the containers 21 through the auxiliary pipe 62, and in which solenoid units 6' are activated by the flow-direction controlling valve 6 to stop gas flow between the second delivery pipes 23' and the tubular first gas passages defined between the outer and inner pipes 211 and 212 in the containers 21, so that the gas within the tubular first gas passages between the outer and inner pipes 211 and 212 cannot flow into the second delivery pipes 23'. In this situation, the gas within the tubular first gas passages between the outer and inner pipes 211 and 212 in the containers 21 can compress the inner pipes 212 so as to extrude the remaining gas from the inner pipes 212. The gas discharged from the inner pipes 212 flows into the first delivery pipes 23 and the gas collecting pipe 24. Then, the flow-direction controlling valve 6 can be adjusted into a second position in which the inner pipes 212 of the containers 21 are communicated with the primary pipe 61 and the input pipe 22 so as to permit the gas to flow from the air compressors 14 into the inner pipes 212 of the containers 21 through the primary pipe 61, and in which the flow-direction controlling valve 6 activates the solenoid units 6' to stop gas flow between the first delivery pipes 23 and the inner pipes 212 of the containers 21, so that the gas within the inner pipes 212 of the containers 21 cannot flow into the first delivery pipes 23. In this situation, the inner pipes 212 expand so as to extrude the gas left in the tubular first gas passages between the outer and inner pipes 211 and 212 from the outer pipes 211. The gas discharged from the outer pipes 211 flows into the second delivery pipes 23' and the gas collecting pipe 24.

Figure 5:
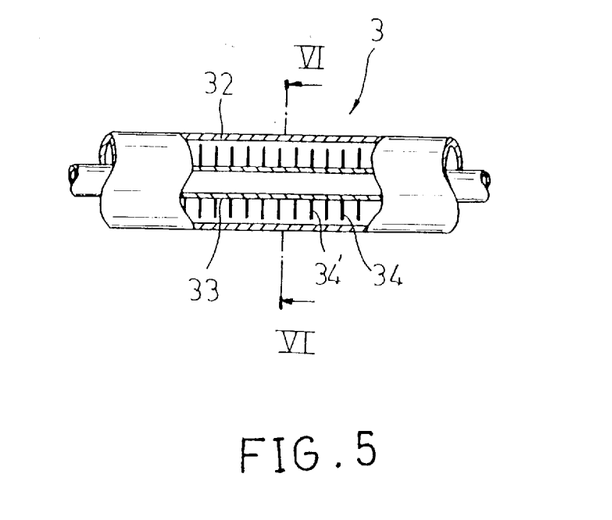
FIG. 5 is a schematic view illustrating the heat exchange device of the hovercraft according to this invention.
Figure 6:
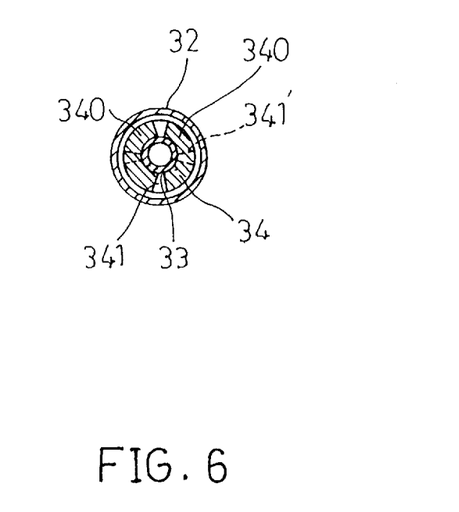
FIG. 6 is a sectional view taken along Line VI—VI in FIG. 5.

Referring to FIGS. 4, 5 and 6, the heat exchange device 3 includes a serpentine outer tube 32 and a serpentine inner tube 33 disposed within the serpentine outer tube 32. The outer and inner tubes 32 and 33 define therebetween a tubular second gas passage which is insulated fluidly from the interior of the inner tube 33. The serpentine inner tube 33 of the heat exchange device 3 has a plurality of parallel, flat, axially spaced-apart heat-conducting fin units 34 and 34' which are welded to an outer surface thereof and which are spaced apart from the inner surface of the serpentine outer tube 32 of the heat exchange device 3. Each of the axially spaced-apart heat-conducting fin units 34 consists of two sector-shaped sheets 340 which define therebetween two diametrically opposed notches 341 and 341' through which the gas can flow. The notches 341 and 341' of each of the axially spaced-apart heat-conducting fin units 34 and 34' are deflected angularly from those of each of the adjacent fin units 34 and 34' by 90 degrees so as to increase contact period of the gas, flowing in the tubular second gas passage which is defined between the serpentine outer and inner tubes 32 and 33, with the fin units 34 and 34' and the outer surface of the serpentine inner tube 33, thus increasing the heat exchange efficiency. The tubular second gas passage defined between the serpentine outer and inner tubes 32 and 33 of the heat exchange device 3 has an input end communicated with the output port 273 of the turbosupercharger 27 and is communicated with the inlet end 311 of the output pipe 31 of the heat exchange device 3. The serpentine inner tube 33 has an input end communicated with the output port 274.

Figure 7:
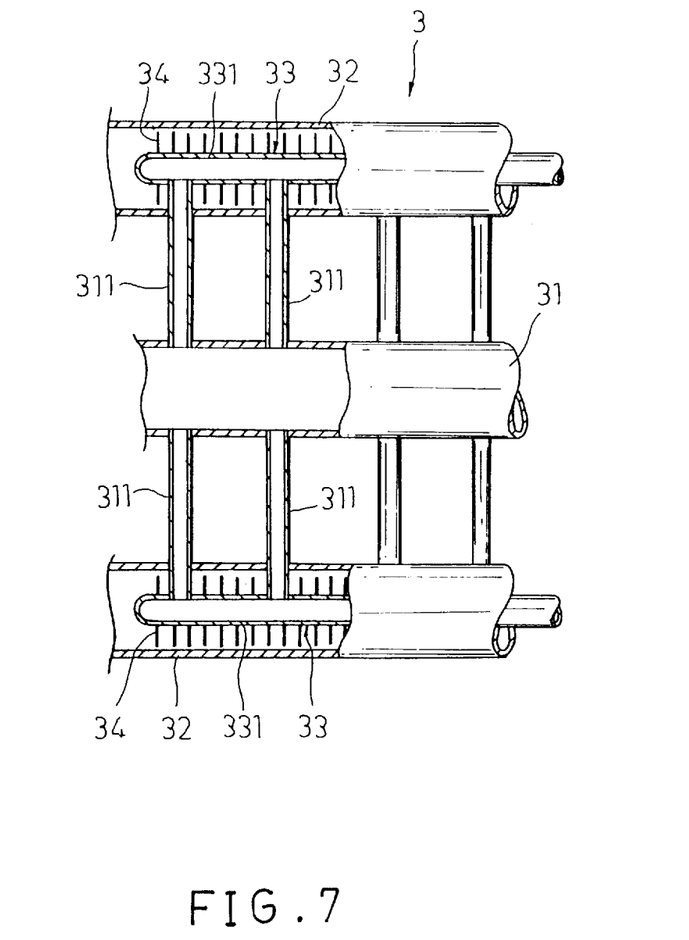
FIG. 7 is a schematic view illustrating a portion of the heat exchange device of the hovercraft according to this invention.

Referring to FIG. 7, the heat exchange device has an output pipe 31 which has an outlet end that is coupled and communicated with the air-cushion generating device 4, and a plurality of siphons 312, each of which is communicated with the output pipe 31 at one end thereof and with the serpentine inner tube 33 at the other end thereof. As illustrated, the inner tubes 33 have closed left ends.

Figure 8:
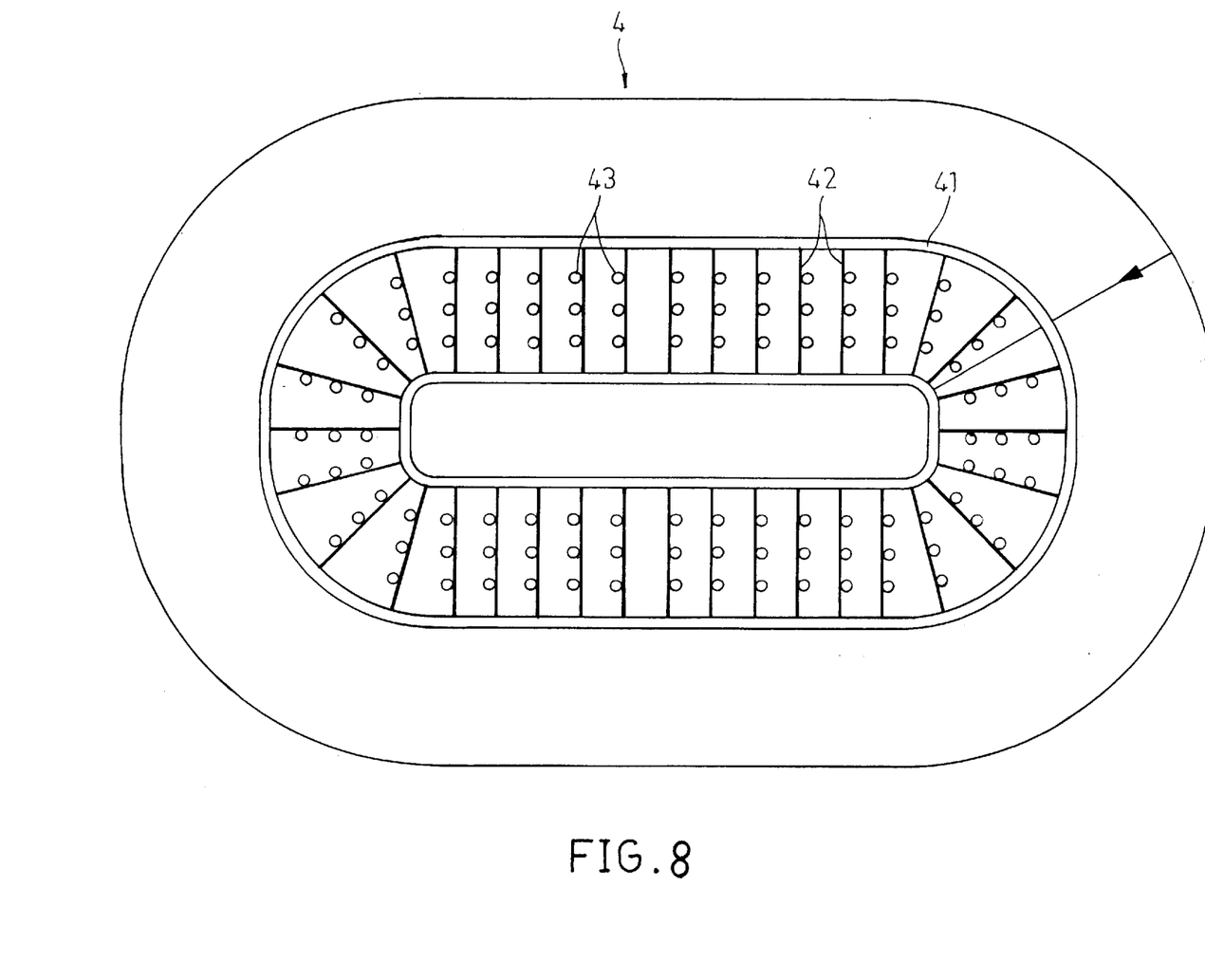
FIG. 8 is a schematic view illustrating the air-cushion generating device of the hovercraft according to this invention.

Referring to FIGS. 1 and 8, on the bottom of the hull 11, the air-cushion generating device 4 is located under the lower end portion of the heat exchange device 3. The heat exchange device 3 is located under the lower end portion of the energy storing unit 2. The air-cushion generating device 4 includes an intake main pipe 41 communicated with the output pipe 31 of the heat exchange device 3, a plurality of branch pipes 42 communicated with the intake main pipe 41, and a plurality of nozzles 43 installed on the branch pipes 42 for discharging the gas from the branch pipes 42 through the nozzles 43, so as to produce continuously a downward gas flow, thereby forming an air cushion within the skirt 111 for supporting the hull 11 thereon.

Figure 9:
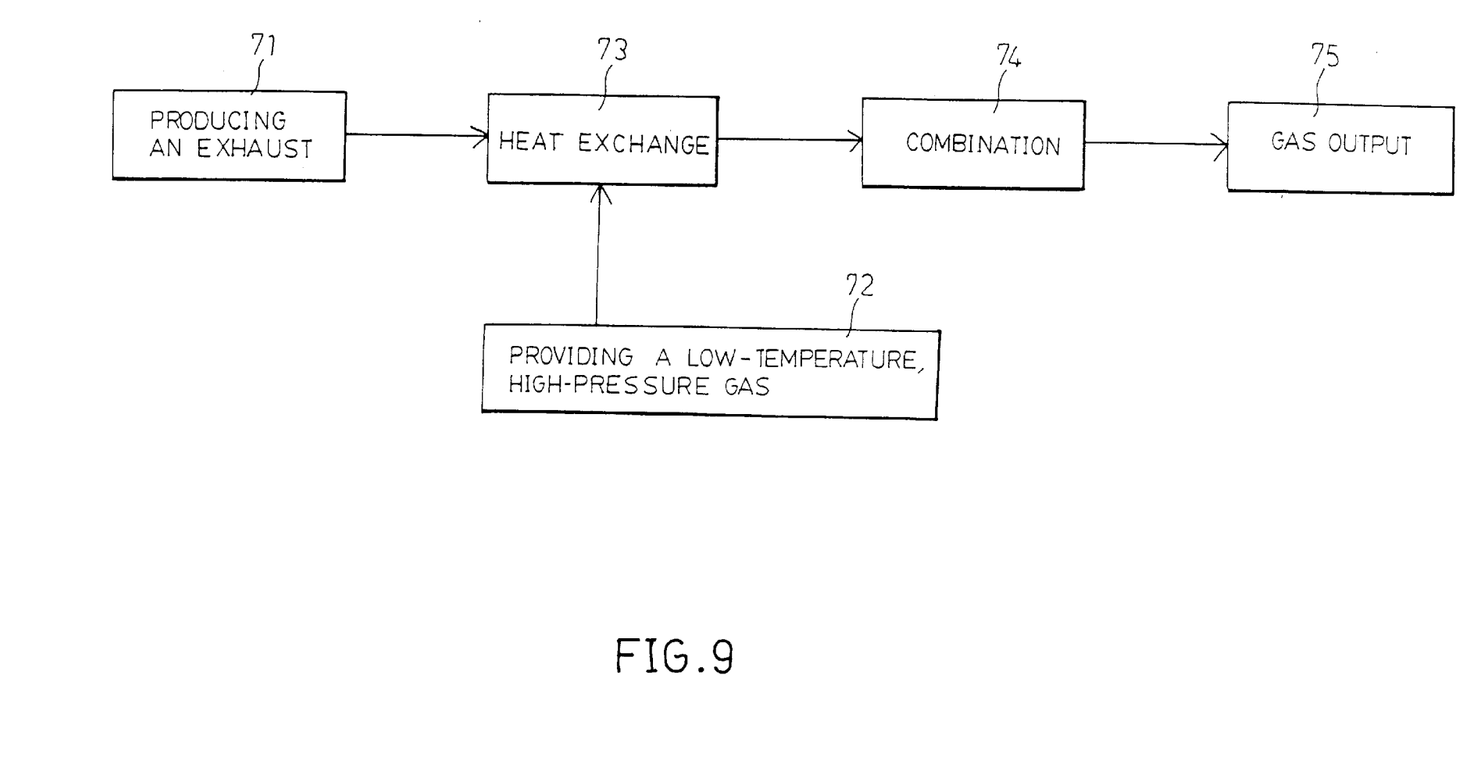
FIG. 9 is a block diagram of an air-cushion producing method for the hovercraft illustrated in FIGS. 1 to 8.

Accordingly, as illustrated in FIG. 10, the air-cushion producing method for the hovercraft illustrated in the FIGS. 1 to 9 includes a step 71 of producing an exhaust, a step 72 of providing a low-temperature, high-pressure gas, a step 73 of heat exchange, a step 74 of combination, and a step 75 of gas output. In particular, the method includes the steps of:

(1) guiding and discharging the high-temperature exhaust from the gas turbine engines 12 on the hull 11 of the hovercraft into the heat exchange device 3 which is provided on the hull 11;

(2) storing the low-temperature, high-pressure gas within the energy storing containers 21 which are disposed on the hull 11;

(3) pumping the low-temperature, high pressure-gas into the heat exchange device 3 so as to exchange heat with the high-temperature exhaust discharged from the gas turbine engines 12, thereby increasing the volume of the gas and decreasing the pressure of the gas;

(4) drawing the exhaust which has undergone heat exchange into the output pipe 31 of the heat exchange device 3 by siphon action so as to combine with the gas in the output pipe 31 of the heat exchange device 3, which has completed heat exchange; and (5) discharging the gas and the exhaust from an output pipe 31 of the heat exchange device 3 into the air-cushion generating device 4 on the bottom of the hull 11 so as to form an air cushion under the hull 11.

In use, before the hovercraft moves away from the harbor, a gas having a low temperature of about 60° to 80° F. and a high pressure of about 49 Kg/cm$^2$ is produced by an inexpensive off-peak power and is stored within the inner pipes 212 of the energy storing containers 21. By starting the diesel engines 13 to activate the propeller propulsion unit 133 on the bottom of the hull 11, the hovercraft can move on the water and away from the harbor. Then, the propeller propulsion units 133 are stopped. The diesel engines 13 are activated again to drive the air compressors 14. At this time, the gas turbine engines 12 are also actuated to drive the propellers 121. A high-temperature exhaust having a temperature of about 300° to 400° F. and a pressure of about 1.02 to 1.05 Kg/cm$^2$ is discharged from the gas turbine engines 12. The gas within the expansion pipe 26 is guided by the turbosupercharger 27 to flow into the tubular second gas passage defined between the serpentine outer and inner tubes 32, 33 through the output port 273 so as to form a negative pressure at the input port 272, thus drawing the high-temperature exhaust from the exhaust ducts 122 of the gas turbine engines 12 and guiding the high-temperature exhaust to flow into the serpentine inner tube 33 of the heat exchange device 3 through the output port 274. When the flow-direction controlling valve 6 is located at the first position, the low-temperature, high-pressure gas within the containers 21 flows into the first delivery pipe 23 and the gas collecting pipe 24 so as to increase the volume of the gas for the first time. The gas within the gas collecting pipe 24 flows into the expansion pipe 26 in a predetermined amount under the control of the flow-rate controlling valve 25 so as to increase the volume of the gas for the second time. Then, the gas flows into the tubular second gas passage defined between the serpentine outer and inner tubes 32 and 33 of the heat exchange device 3 through the input port 271 of the turbosupercharger 27 by the guidance of the turbosupercharger 27. The gas in the tubular second gas passage defined between the serpentine outer and inner tubes 32 and 33 has a temperature of about 50° F. and a pressure of about 4 Kg/cm$^2$. At this time, the negative pressure at the input port 272 of the turbosupercharger 27 urges the high-temperature exhaust to be drawn from the exhaust ducts 122 into the inner tube 33 via the output port 273. In this case, as shown in FIG. 7, the low-temperature gas flows in the tubular second gas passage defined between the outer and inner tubes 32 and 33, while the high-temperature exhaust flows in the inner tube 33 so as to perform heat exchange. Accordingly, the temperature of the gas in the heat exchange device 3 increases from 50° F. to 160° F. The pressure of the gas is more than 4.5 Kg/cm$^2$. After this heat exchange, the gas is combined with the exhaust by siphon action and flows into the air-cushion generating device 4 which produces an air cushion.

In a situation where only a very small amount of gas remains in the inner pipes 212 of the containers 21 and cannot be discharged therefrom by the pressure of the gas in the inner pipes 212, a certain amount of gas having a pressure of 7 Kg/cm$^2$ is fed from the air compressors 14 into the tubular first gas passages defined between the outer and inner pipes 211 and 212 in the containers 21 under the control of the flow-direction controlling valve 6. In this way, the gas left in the inner pipes 212 of the containers 21 can be extruded from the inner pipes 212 due to the fact that the inner pipes 212 are compressed by the pressure of the gas within the tubular first gas passage defined between the outer and inner pipes 211 and 212.

In a case where the hovercraft is on the sea and no gas is left in the inner pipes 212 of the containers 21, the flow-direction controlling valve 6 is adjusted so as to guide the gas to flow from the air compressors 14 into the primary pipe 61 and the inner pipes 212 of the containers 21. At this time, the gas in the tubular first gas passages between the outer and inner pipes 211 and 212 in the containers 21 flows into the gas collecting pipe 24 through the second delivery pipe 23' so as to supply the gas stably and continuously into the air-cushion generating device 4. In this way, the time for the hovercraft to move on the sea without refueling is greatly increased.

When the hovercraft moves into another harbor, the propeller propulsion units 133 are employed again to move the hovercraft.

With this invention thus explained, it is apparent that numerous modifications and variations can be made without departing from the scope and spirit of this invention. It is therefore intended that this invention be limited only as indicated in the appended claims.

I claim:

1. A hovercraft including a boat hull, a gas turbine engine unit installed on the boat hull, an air-cushion generating device disposed on the boat hull, and a propeller device drivable by the gas turbine engine unit, the hull having a skirt at a bottom thereof, the gas turbine engine unit being provided with an exhaust duct unit, wherein the improvements comprise:

the hull further including an energy storing unit and a heat exchange device which are disposed thereon, said energy storing unit including a plurality of energy storing containers attached to said hull, said heat exchange device having an output pipe which has an outlet end that is coupled and communicated with the air-cushion generating device, each of said containers being adapted to receive therein a low-temperature, high-pressure gas which flows into said heat exchange device, said gas turbine engine unit being capable of operating and discharging a high-temperature exhaust therefrom which flows into said heat exchange device so as to exchange heat with the low-temperature, high-pressure gas coming from said containers, thus increasing volume of said gas and decreasing pressure of said gas, whereby said air-cushion generating device can produce continuously a downward gas flow so as to form within said skirt an air cushion for supporting the hull.

2. A hovercraft as claimed in claim 1, wherein said air-cushion generating device includes an intake main pipe communicated with said output pipe of said heat exchange device, a plurality of branch pipes communicated with said intake main pipe, and a plurality of nozzles installed on said branch pipes for discharging the gas from said branch pipes through said nozzles.

3. A hovercraft as claimed in claim 1, wherein each of said containers has an outer pipe, and a compressible inner pipe which is adapted to receive the low-temperature, high-pressure gas therein and which is disposed within said outer pipe so as to define between said outer and inner pipes a tubular first gas passage that is insulated fluidly from interior of said inner pipe, said energy storing unit further including an input pipe communicated with said containers, a primary pipe adapted to be communicated with both a gas supply source and said inner pipes of said containers, an auxiliary pipe communicated with both said input pipe and said tubular first gas passage defined between said outer and inner pipes in said containers so that the gas can flow from said input pipe into said auxiliary pipe, a first delivery pipe unit communicated with said inner pipes of said containers, a second delivery pipe unit communicated with said tubular first gas passage defined between said outer and inner pipes in said containers, and a gas collecting pipe communicated with said first and second delivery pipe units, said hull further including two air compressors disposed thereon, and two power sources disposed on said hull and communicated with said input pipe so as to drive said air compressors respectively.

4. A hovercraft as claimed in claim 3, wherein said gas collecting pipe has an output end, said energy storing unit further including an expansion pipe communicated with the output end of said gas collecting pipe, a flow-rate controlling valve unit interposed between said gas collecting pipe and said expansion pipe so as to control flow rate of the gas between said gas collecting pipe and said expansion pipe, and a turbosupercharger having two input ports and two output ports, one of said input ports being communicated with the output end of said gas collecting pipe, the other one of said input ports being communicated with said exhaust duct unit of said gas turbine engine unit, said heat exchange device including a serpentine outer tube and a serpentine inner tube disposed within said serpentine outer tube, said outer and inner tubes defining therebetween a tubular second gas passage which is insulated fluidly from interior of said inner tube, one of said output ports of said turbosupercharger being communicated with said inner tube, the other one of said output ports of said turbosupercharger being communicated with said tubular second gas passage which is defined between said serpentine outer and inner tubes.

5. A hovercraft as claimed in claim 4, wherein said tubular second gas passage defined between said outer and inner tubes of said heat exchange device is communicated with said input pipe of said heat exchange device, said serpentine inner tube of said heat exchange device being communicated with said exhaust duct unit of said gas turbine engine unit.

6. A hovercraft as claimed in claim 5, wherein said serpentine inner tube of said heat exchange device has a plurality of parallel, flat, axially spaced-apart heat-conducting fin units which are welded to an outer surface thereof and which are spaced apart from an inner surface of said serpentine outer tube of said heat exchange device, each of said axially spaced-apart heat-conducting fin units having a notch through which the gas can flow, said notches of each adjacent pair of said axially spaced-apart heat-conducting fin units being deflected from each other so as to increase contact period of the gas, flowing in said tubular second gas passage which is defined between said serpentine outer and inner tubes, with said fin units and the outer surface of said serpentine inner tube, thus increasing heat exchange efficiency.

7. A hovercraft as claimed in claim 5, wherein said heat exchange device further includes a plurality of siphons, each of which is communicated with said output pipe of said heat exchange device at an end thereof and with said serpentine inner tube of said heat exchange device at the other end thereof.

8. A hovercraft as claimed in claim 3, wherein said energy storing unit further includes a flow-direction controlling valve installed among said input pipe, said primary pipe, and said auxiliary pipe, said flow-direction controlling valve being located at a first position in which said tubular first gas passage defined between said outer and inner pipes in said containers are communicated with said input pipe and said auxiliary pipe so as to permit the gas to flow from said air compressors into said tubular first gas passages defined between said outer and inner pipes in said containers through said auxiliary pipe, and in which gas flow between said second delivery pipe unit and said tubular first gas passage defined between said outer and inner pipes of said containers is stopped under control of said flow-direction controlling valve so that the gas within said tubular first gas passage defined between said outer and inner pipes cannot flow into said second delivery pipe unit, said flow-direction controlling valve being adjustable to a second position in which said inner pipes of said containers are communicated with said primary pipe and said input pipe so as to permit the gas to flow from said air compressors into said inner pipes of said containers through said primary pipe, and in which gas flow between said first delivery pipe unit and said inner pipes of said containers is stopped under control of said flow-direction controlling valve so that the gas within said inner pipes of said containers cannot flow into said first delivery pipe unit.

9. A hovercraft as claimed in claim 3, wherein said hull is equipped with two propeller propulsion units which are adapted to be driven by said power sources to operate in a harbor so as to move said hovercraft in the harbor.

10. A hovercraft as claimed in claim 3, wherein said air-cushion generating device is located under said heat exchange device, said heat exchange device being located under said energy storing unit.

11. An air-cushion producing method for a hovercraft comprising the steps of:
   (1) guiding and discharging a high-temperature exhaust from a gas turbine engine unit on a hull of said hovercraft into a heat exchange device which is provided on said hull;
   (2) storing a low-temperature, high pressure gas within a plurality of energy storing containers which are disposed on said hull;
   (3) pumping said low-temperature, high pressure-gas into said heat exchange device so as to exchange heat with said high-temperature exhaust from said gas turbine engine unit, thereby increasing volume of said gas and decreasing pressure of said gas; and
   (4) discharging the gas from an output pipe of said heat exchange device into an air-cushion generating device on a bottom of said hull so as to form an air cushion under said hull.

12. A method as claimed in claim 11, further comprising between steps (3) and (4) a step of drawing the exhaust which has undergone heat exchange into said output pipe of said heat exchange device by siphon action so as to combine with the gas in said output pipe of said heat exchange device, which has completed heat exchange, thereby discharging the gas and the exhaust from said output pipe of said heat exchange device into said air-cushion generating device.

* * * * *